Nov. 4, 1969  E. C. LETTER  3,476,461
DIRECTIONAL PHOTOTROPIC OPTICAL SYSTEM
Filed Oct. 17, 1966

EUGENE C. LETTER
INVENTOR.

BY
*Lowell Jerkie*
ATTORNEY

United States Patent Office
3,476,461
Patented Nov. 4, 1969

3,476,461
DIRECTIONAL PHOTOTROPIC OPTICAL SYSTEM
Eugene C. Letter, Penfield, N.Y., assignor to Bausch & Lomb Incorporated, Rochester, N.Y., a corporation of New York
Filed Oct. 17, 1966, Ser. No. 587,143
Int. Cl. G02f 1/28, 1/36; G02b 27/00
U.S. Cl. 350—160                    5 Claims

ABSTRACT OF THE DISCLOSURE

A phototropic optical system is disclosed which is particularly adapted for use in sunglasses. A reflecting element is mounted adjacent to a transparent wedge which is coated on the two major faces with phototropic material. Ultra-violet radiation from the direction in which the system faces is reflected by the element into the wedge to darken the phototropic layers. The outer phototropic layer is covered by a layer of material which passes visible light but reflects or absorbs the ultra-violet light so that the stray light in the environment does not cause the phototropic layers to darken.

---

This invention relates to optical systems having phototropic materials. In particular, it has been discovered that materials which decrease the transmission of visible light in response to ultra-violet intensity can be effectively used in an optical system which changes optical density only under the influence of rays directed from the line of sight and avoids exposure of the phototropic material to stray light. The invention is especially useful when incorporated in the lenses of sunglasses, and flashblindness protection devices may be made using high-speed photo-sensitive materials.

Phototropism is a phenomenon which occurs when the color of a material undergoes reversible change when exposed to electromagnetic radiation. The most commonly used phototropic materials are those which undergo rapid darkening in the visible range when exposed to rays in the visible or ultra-violet ranges and lighten when irradiation ceases. The materials used are most usually solids, but liquids or dispersions may be used. These materials are frequently referred to as photochromic as well as phototropic.

This phenomenon has been utilized in numerous optical systems, and phototropic materials are particularly useful in light filters, sun glasses, etc., where the amount of light passing through a semi-transparent window or lens is desired to be controlled to a low level of intensity. The benefits to the observer are reduced glare and eye-strain; and where the response time of the phototropic material is sufficient, the phenomenon may be used for flash-blindness protection. The invention may be used in any system where it is desired to increase the optical density of a first waveband of radiation in response to the increase of intensity of a second waveband of actinic radiation.

For most of the practical applications of phototropic bodies, it is desired to modulate the intensity of visible light traveling toward the viewer from a radiation source or to darken the body in response to the radiation intensity in a given field of view. Human vision is normally confined to a relatively narrow cone of about 30° for the desired viewing direction, and light rays emanating outside this field are of little interest to the observer. However, these outside rays of incidental light can cause undesirable glare and diminish the observer's ability to see the desired rays in a satisfactory manner. If one is viewing a relatively dark subject in the viewing direction under environmental conditions of high ambient light or scattered rays striking the surface of a phototropic lens, the darkening of the lens will obscure the desired field of view excessively.

It is an object of this invention to render the phototropic material in an optical system responsive to rays from the direction of the desired view and non-responsive to rays incident upon the optical system from a direction outside the desired field of view. While the changes in spectral absorption in phototropic materials is most rapidly observed in the visible range, it is known that the phototropic reactions are caused by actinic radiation outside the visible range, most commonly ultra-violet rays which are associated with visible light emitted from most radiation sources. Sunlight contains substantial amounts of ultra-violet rays which react with the photosensitive components in a phototropic optical system. Taking advantage of this observation about the nature of phototropic materials, the present invention provides means for rejecting the actinic rays incident upon the front surface of the lens, by absorbing or reflecting the actinic rays while transmitting the desired radiation. By redirecting the actinic rays traveling along with the visible rays from a radiation source toward the viewer in a transverse direction away from the front surface of the lens or window where they would be rejected and onto a rear surface of the phototropic body, there is no phototropic reaction caused by any rays approaching the lens from the front. In this manner, the actinic rays reaching the phototropic material may be selected from a particular directional source, and the effects of ambient rays are reduced.

It is a further object of this invention to provide sunglasses by incorporating the above concept into a spectacle design, which darkens the lens system only in response to radiation from the field of view. These and other objects and features of the invention will be seen in the following description and in the drawing, wherein.

For illustrating the fundamental concepts of the invention, the visible spectrum will be selected as the desired waveband to be transmitted by the optical system, and ultra-violet rays will be selected as the actinic waveband of electromagnetic radiation for exciting the phototropic reaction.

No general conclusion can be drawn from the relation between the actinic wavebands and the non-actinic absorbed spectrum. The lower visible wavelengths and ultra-violet radiation (about 2000 to 4000 A.) are the most common actinic rays (however, gamma-rays and X-rays may be actinic, also). It is generally believed that the reversal process is induced by the absorption of non-actinic rays and by thermal energy after the intensity of the actinic radiation has decreased.

Materials which exhibit phototropic properties are numerous and varied in their other physical properties. Many inorganic and organic solids and liquids are suitable, including alkaline earth sulfides and titanates, mercury compounds, metal oxides, anils, Schiff bases, disulphoxides, hydrazones, spiropyrans, dyes, enzymes, and mixtures. Dispersions and solutions of the active phototropic components in carriers are common in phototropic devices, and incorporation of such components in transparent resins has proven successful. A survey of "Phototropism" by Brown and Shaw in "Reviews of Pure and Applied Chemistry," vol. 11, No. 1, March 1961, presents a variety of materials which may be used in this invention. In British patent specification 1,010,234, Wagner described mercury thiocarbazone distributed in polystyrene, cellulosic esters, PVC resins, acrylates, etc., as phototropic bodies. Weber et al. have studied coronene extensively and reported in "Research on Triplet States and Photochromism," AD434239 U.S. Dept. of Com. (1963) that this fast response compound may be incorporated in polymethylmethacrylate with desirable results. The active material may be positioned in the system in many ways depending upon its own physical structure. Filmed substrates, lens-held fluids, thin layers, etc., are some of the feasible means for disposing the active material in the optical system.

Figure 1:
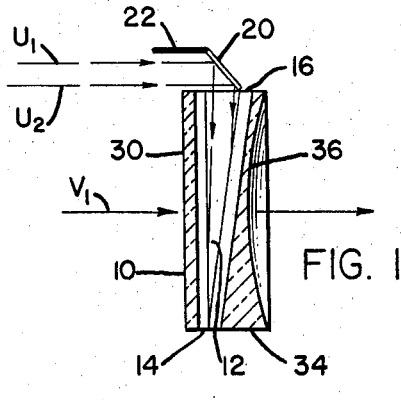
FIGURE 1 is a vertical cross-sectional view of an optical system showing the functions and optical effects of the components.

As shown in FIGURE 1 the optical system 10 may include an intermediate ray path, such as wedge 12 of optical material transparent to the actinic light disposed between layers 14 and 16 of phototropic character. A mirror 20 deflects actinic rays $U_1$ and $U_2$ from a paraxial direction to a direction transverse to the optical system axis. A shield 22 aids in preventing stray radiation from entering the interior portions of the device. A front layer 30 transmits visible ray $V_1$ and absorbs or reflects actinic rays. A lens power may be given to the system by disposing a back element 34 having a curved surface 36. The mirror 20 can be a bar-shaped element mounted at about a 45° angle to the optical axis, and shield 22 can form part of the mounting. When wedge 12 is of sufficient dispersive power and configuration to cause color separation or defects in the desired system optics, this can be compensated by a second inverted wedge placed near the actinic light transmitting elements.

Figure 2:
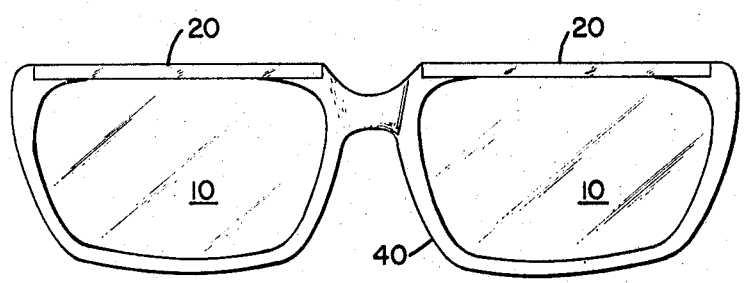
FIGURE 2 is a front elevation view of a spectacle frame using phototropic filter lenses.

When the optical system is incorporated into a spectacle frame 40, shown in FIGURE 2, the mirrors 20 are aligned with the lenses 10 to deflect ultra-violet rays traveling in a direction from a source of light rays in the field of view. Normally, a waveband of ultra-violet radiation is associated with the visible spectrum of direct or reflected sunlight. Mirror 20 may be a smooth aluminum surface or an enhanced optical reflector for deflecting ultra-violet rays. Wedge 12 can be made of U-V grade fused silica, and a cerium silicate glass provides sufficient ultra-violet absorption to be used as front surface 30. Alternatively, a thin $Ce_2O_3$ film can absorb these rays, or a dichroic mirror which selectively transmits visible and reflects ultra-violet rays is suitable.

Figure 3:
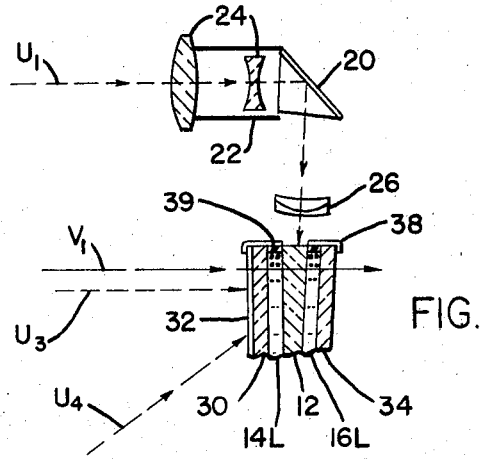
FIGURE 3 is a cross-section, partially cut away, of an embodiment of the invention. Like numerals refer to like parts throughout the drawing.

The embodiment in FIGURE 3 uses fluid phototropic layers 14L and 16L, which are held in the lens by clamps 38 and gaskets 39. The front plate 30 is coated with a thin filter 32. The amount of actinic radiation redirected to impinge upon the phototropic optical elements 14L and 16L may be increased by using cylindrical lenses 24 and 26 to modify the ray paths and distribute the actinic rays evenly through interior wedge 12. Also, the embodiment of FIGURE 3 shows a reflecting prism 20. Visible ray $V_1$ and actinic rays $U_1$, $U_3$ approach the optical system from the direction of the field of view, and their relative intensities are related to a radiation source. Ray $U_1$ is directed to the phototropic layers. $U_3$ is filtered from the visible ray $V_1$, which is transmitted. An incidental ray of actinic light $U_4$ is also filtered by film 32. Other stray rays approaching lens 24 will be directed away from the interior of the lens system.

Numerous modifications may be made to the disclosed optical systems within the inventive concepts. For instance, internally-reflecting optical fibers may be used to redirect the actinic rays. Such fibers can be disposed around the periphery of the lenses and bent inwardly. Many materials, such as methacrylate and allyl polymers or fibrous ceramics, can be formed in thin fibers which transmit actinic rays. Such configurations can greatly affect the design flexibility of the optical systems using this invention. Where the system parameters permit, a single phototropic layer can be used. Also a vacuum or gas can be used in the interior of the lens where no support functions are needed from the wedge 12, provided internal reflections are minimized. By properly manipulating the direction of actinic rays at the periphery of the system, the wedge 12 can assume other geometric shapes, including curved surfaces.

While there has been shown and described what are considered to be preferred embodiments of the present invention, it will be obvious to those skilled in the art that various changes and modifications may be made therein without departing from the invention.

What is claimed is:

1. In an optical system of the type having a front surface for the admission of radiation thereto and a phototropic optical element which transmits electromagnetic radiation of a first waveband from a radiation source in response to the intensity of a second waveband of electromagnetic radiation from the radiation source, the relative intensities of the radiation of the first and second wavebands emitted by the radiation source being essentially constant, the improvement which comprises:
    means for reflecting rays of the second waveband which initially travel in a first direction from the radiation source toward the front surface of the optical system to a second direction transverse to the first direction to impinge the phototropic optical element to attenuate the first waveband transmission of the phototropic optical element with increased radiation intensity of the second waveband, and
    means for rejecting second waveband radiation incident upon the front surface of the optical system, so that stray radiation from a direction other than the direction of the radiation source does not substantially affect the first waveband transmission of the optical system.

2. The optical system of claim 1 wherein the first waveband comprises visible light and the second waveband comprises ultra-violet light.

3. The optical system of claim 2 wherein the optical system is mounted in a spectacle frame.

4. An optical element comprising in combination a thin wedge of material transparent to visible and ultra-violet rays and disposed transverse to an optical axis,
    two layers of phototropic material having increasing optical density with increased ultra-violet intensity, the phototropic layers being adjacent the thin wedge on opposite sides of the wedge and transverse to the optical axis,
    an ultra-violet filter which transmits visible rays covering an outer layer of one of the phototropic layers, and
    an ultra-violet reflector mounted adjacent an exposed side of the thin wedge for reflecting ultra-violet rays traveling essentialy parallel to the optical axis onto the phototropic layer surfaces adjacent the thin wedge.

5. An optical system according to claim 1 wherein the phototropic optical element includes at least one layer of phototropic material disposed transverse to the first direction,
- the means for rejecting second waveband radiation comprises a selective optical filter disposed between the phototropic optical element and the radiation source, and
- the means for reflecting directs the second waveband radiation from the first direction which is incident thereon onto the interior surface of the phototropic layer.

References Cited

UNITED STATES PATENTS 3,152,215  10/1964  Barstow et al. _____ 88—61
3,269,267  8/1966  Collins.

RONALD L. WIBERT, Primary Examiner

PAUL K. GODWIN, Assistant Examiner

U.S. Cl. X.R.

350—276, 311; 351—44